United States Patent [19]

Dryga et al.

[11] Patent Number: 4,928,554

[45] Date of Patent: May 29, 1990

[54] UNBALANCE VIBRATOR

[76] Inventors: Alexandr I. Dryga, ulitsa Marata, 6, kv. 64.; Vyacheslav M. Alexeev, ulitsa Jubileinaya, 44, kv. 62., both of Kramatorsk; Sergei A. Polovoi, ulitsa Fryazevskaya, I5, korpus 5, kv. 404., Moscow, all of U.S.S.R.

[21] Appl. No.: 291,778

[22] Filed: Dec. 29, 1988

[51] Int. Cl.[5] .......... F16H 33/10

[52] U.S. Cl. .......... 74/87; 366/128

[58] Field of Search .......... 366/128, 116; 209/366.5, 367; 74/87, 61

[56] References Cited

U.S. PATENT DOCUMENTS

| | | | |
|---|---|---|---|
| 2,294,448 | 9/1942 | Coyle et al. | 209/367 |
| 2,677,967 | 5/1954 | Galbraith | 74/87 |
| 2,852,946 | 9/1958 | Petrin | 74/87 |
| 2,865,210 | 12/1958 | Fisher | 74/61 |
| 2,930,244 | 3/1960 | Hutchinson et al. | 74/87 |
| 3,097,537 | 7/1963 | Peterson | 74/61 |
| 4,236,417 | 12/1980 | Riedl | 74/87 |

FOREIGN PATENT DOCUMENTS

| | | | |
|---|---|---|---|
| 1297928 | 6/1969 | Fed. Rep. of Germany . | |
| 956051 | 9/1982 | U.S.S.R. . | |
| 202995 | 10/1924 | United Kingdom | 74/61 |

*Primary Examiner*—Allan D. Herrmann
*Assistant Examiner*—Janice E. Chartoff
*Attorney, Agent, or Firm*—Fleit, Jacobson, Cohn, Price, Holman & Stern

[57] ABSTRACT

An unbalance vibrator including a drive shaft mounting unbalance weights, which are a clearance fit with respect to each other, and a mechanism for adjusting their mutual position. The adjusting mechanism is made in the form of two coaxially arranged cylinders carrying the unbalance weights and joined together by joining members provided on their engageable surfaces. One of the cylinders is rigidly mounted on the drive shaft, while the other cylinder is mounted so as to be turnable and axially traversable.

4 Claims, 3 Drawing Sheets

UNBALANCE VIBRATOR

TECHNICAL FIELD

The present invention relates generally to vibration engineering and more specifically, to the unbalance vibrator for vibratory devices.

The invention may be used to best advantage for a number of applications which include vibrostabilizing treatment of components machined by press-working or cutting as well as by welding or casting for the purpose of stabilizing their geometric dimensions and shape or reducing residual stresses; vibration loading for testing the effect of vibrational overloads on the operational reliability and vibration-resistance, for example, of aircraft.

The present invention can also be employed in other fields such as vibroabrasive treatment of components, for example, in deburring or descaling machines, construction materials industry (e.g., concrete compaction machines or pile driving machines), highway engineering (e.g., asphalt or gravel compaction machines), as well as transportation devices, such as vibratory feeding or conveying apparatus.

BACKGROUND OF THE INVENTION

At the present time, extending the processing capacities of vibratory equipment under development is an urgent problem since it allows reductions in the component machining time and, consequently, in power consumption, which leads to increased productivity per unit time and improved quality of vibration treatment. Unbalance vibrator used most commonly for the generation of disturbing forces are of the mechanical inertia unbalance type which offers simplicity in operation and fairly high disturbing forces. Under operation conditions, a necessity may often arise for the amount of disturbing force generated by the vibratory device to be adjusted over a wide range, for example, in order to adjust the oscillation amplitude in the vibratory device.

The amount of vibrational force generated is directly proportional to the mass of unbalance weight, which is arranged eccentrically with respect to the axis of rotation of the drive shaft, the distance of the center of this mass from the axis of rotation of the drive shaft, and to the squared frequency of rotation (angular velocity) of the drive shaft.

By virtue of the fact that varying the frequency of rotation of the drive shaft over a wide range necessitates the use of a d.c. motor in conjunction with a supply voltage regulator, the simplest ways of varying the amount of the disturbing force would be either by changing the eccentric mass of the unbalance vibrator or by altering the distance from the center of its masses to the axis of rotation of the drive shaft.

Known in the present state of the art in unbalance vibrator (SU, A, 956,051) comprising a drive shaft, two unbalance weights, which are mounted on the drive shaft so as to be turnable with respect to each other, a mechanism for adjusting the mutual position of the unbalance weights, which is made in the form of a rod and a hollow cylinder having helical grooves provided on its cylindrical surface, each of the grooves being adapted to interact with one of the unbalance weights. The cylinder is installed so as to be traversable lengthwise the shaft, and the rod is connected to the cylinder. A disadvantage inherent in the device described above resides in the fact that the mechanism for adjusting the mutual position of unbalance weights is too cumbersome and features sophisticated construction.

The closest to the herein proposed invention is a centrifugal unbalance vibrator (DE, C, 1,297,928) comprising a fixed a shaft fitted in a rotary electric motor. Fixed stationary on the housing of the electric motor is an unbalance weight made in the form of an arc-shaped guideway supporting another movable unbalance weight made in the form of an arc-shaped element. The unbalance weights are provided with a mechanism for adjusting their mutual position and fashioned as a pin retainer spring-loaded in a radial direction. One end of the retainer engages in one of the radial through holes provided in the movable weight so that movement of the movable unbalance weight will cause a change in the amount of the disturbing force produced by the unbalance vibrator.

A substantial disadvantage of the prior-art unbalance vibrator mentioned above resides in the fact that the mechanism for adjusting the mutual position of the unbalance weights does not allow the disturbing force to be varied over a wide range, or its smooth adjustment, which prevents vibration treatment of a wide range of products. Inconvenience caused by the prior-art unbalance vibrator lies with the sophisticated adjustment of the disturbing force, since the adjustment process involves the use of an additional tool, such as a cylindrical pin or rod, which has to be fitted, in succession, in each of the through holes passing underneath the extensible retainer, thus increasing the total adjustment time.

Furthermore, the unbalance vibrator discussed above features a comparatively high drag coefficient because of the clearance between the movable unbalance weight and the motor housing, which increases noise when the unbalance vibrator operates.

SUMMARY OF THE INVENTION

It is therefore an object of the present invention to extend the processing capacities of the unbalance vibrator.

It is also an object of this invention to simplify the adjustment of the amount of the disturbing force and to reduce the adjustment time.

It is another object of this invention to reduce noise caused by the operation of the unbalance vibrator.

With the foregoing and other objects in view the present invention thus resides in the fact that in an unbalance vibrator comprising a drive shaft mounting unbalance weights, which are a clearance fit on the shaft and are turnable with respect to each other, and a mechanism for adjusting their mutual position, according to the invention, the adjusting mechanism is made in the form of two coaxially arranged cylinders carrying the unbalance weights and joined together by joining members provided on their engaging surfaces, one of the cylinders being rigidly mounted on the drive shaft while the other cylinder is mounted so as to be turnable and axially traversable. The coaxial arrangement of the cylinders enables the unbalance weights to be put in an enclosed space, which reduces drag, abates noise and decreases losses of energy. By virtue of engagement between the unbalance weights and the joining members, the mutual position of the unbalance weights can be varied from perfect coincidence to being turned opposite each other, i.e., 180° out of phase, which makes it possible to change the disturbing force from its greatest to zero (for unbalance weights of a given mass) whereas the movable unbalance weight traversable in an axial direction allows the mutual position of the unbalance weights to be altered, whereby the disturbing force can be smoothly adjusted over its entire range. The above-described proporties of the unbalance vibrator expand the range of products treated, hence the processing capacities of the unbalance vibrator.

According to the preferred embodiment of the present invention, the movable cylinder is spring-loaded and in axial direction, and the cylinders have on the grooved portions thereof annular grooves whose width is greater than the distance between the adjacent grooves. The grooves enable the joining members to be brought out of engagement and provide for smooth adjustment of the disturbing force. Spring-loading of the movable unbalance weight makes it possible to positively lock the unbalance weights in their working position.

According to another embodiment of the invention, the movable cylinder has an annular groove thereof provided at the point where it engages with the drive shaft, while the drive shaft has an axial hole therethrough ending in a radial slot whose length is greater than the clearance between the unbalance weights, the axial hole of the drive shaft being adapted to receive a spring-loaded rod provided with a radial hole therethrough disposed close to the annular groove, and a retainer being fitted in the radial holes provided in the drive shaft and rod. Such an embodiment of the invention allows the drive shaft to be installed on two supports, which, in turn, permits use of unbalance weights of greater mass, thus sharply increasing the disturbing force, whereby components of far greater mass can be treated, which extends the processing capacities of the unbalance vibrator.

According to still another embodiment of the invention, the movable cylinder has an annular groove provided at the point where it engages with the drive shaft, while the drive shaft has an axial hole having at its end a radial hole engageable with the annular groove adapted to receive a retainer, the axial hole accommodating an adjusting rod adapted to interact with holes arranged under the retainer. The balls permit the retainer to be positively locked (without backlash) in the groove. This embodiment is preferable for high-speed unbalance vibrators because positive locking of the movable parts prevents backlash and extends service life of the unbalance vibrator.

BRIEF DESCRIPTION OF THE DRAWINGS

In what follows the present invention will now be disclosed in a detailed description of an illustrative embodiment thereof with reference to the accompanying drawings, wherein.

BRIEF DESCRIPTION OF PREFERRED EMBODIMENTS

Figure 1:
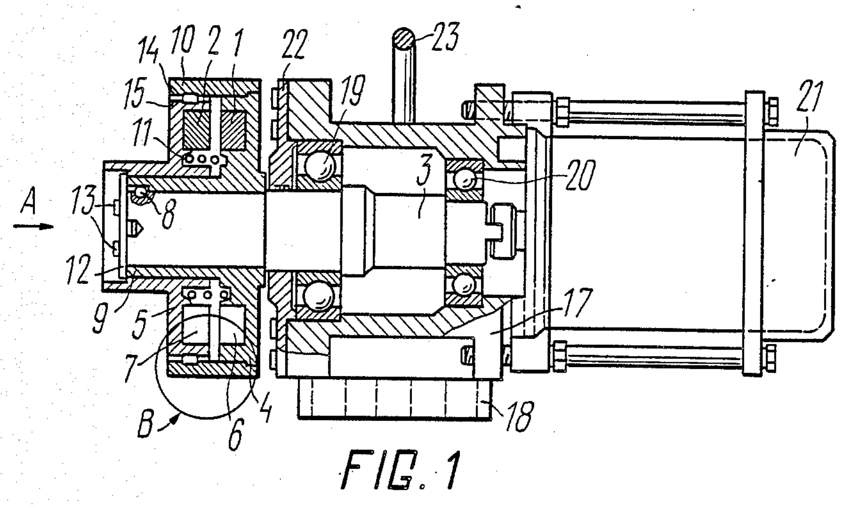
FIG. 1 is a general longitudinal sectional view of an unbalance vibrator, according to the invention.

An unbalance vibrator comprises two unbalance weights 1, w located within annular chambers 6, 7, respectively (FIG. 1) and a mechanism for adjusting their mutual position made in the form of a drive shaft 3 mounting two coaxially arranged cylinders 4, 5, said unbalance weights 1, 2 being secured to or cast integral with annular opposite chambers provided on the cylinders. The cylinder 4 secured to the drive shaft 3 by means of a retainer 8 has an extended hub 9 thereof carrying the cylinder 5 which is mounted slidable and turnable with respect to the hub. The cylinder 5 is enclosed along its periphery in a casing 10 rigidly secured to or cast integral with the cylinder.

Figure 2:
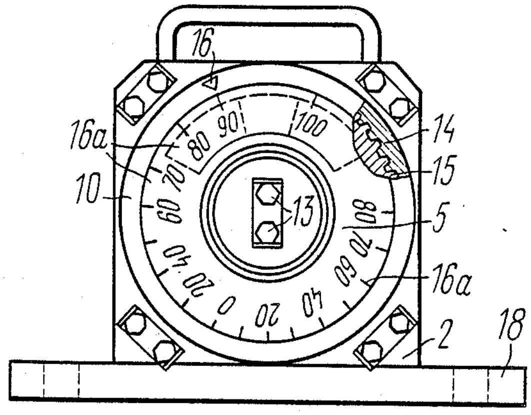
FIG. 2 is a view as seen facing an arrow A in FIG. 1 (partly cut away), according to the invention.
Figure 3:
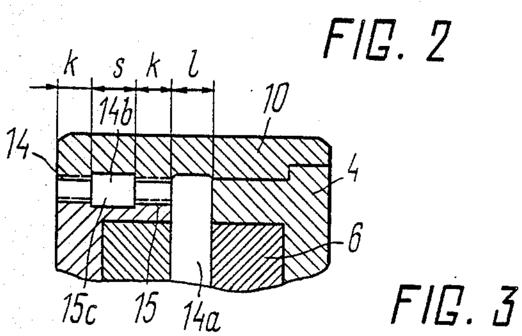
FIG. 3 is a scaled-up view of unit B in FIG. 1 (partly cut away), according to the invention.

The cylinder 5 is a spring-loaded in an axial direction through the agency of a spring 11 fitted between the cylinders 5 and the cylinder 4 rigidly secured to the drive shaft 3. On the outer side, movement of the cylinder 5 is restricted by a flange 12 held to the drive shaft 3 by bolts 13. Torque transmission is effected by a joining member 14 (FIG. 2) provided on the inside surface of the protruding portion of the casing 10. The joining member 14 can be made in the form of fine-module teeth, splines, keying, etc. The joining member 14 engages with its mating joining member 15 provided along the periphery of the cylinder 5. To allow the cylinder 5 to be brought out of engagement and turned relative to the cylinder 4, thus adjusting the disturbing force, said joining members 14, 15 are provided with annular grooves 14*a*, 14*b*, 15*c* (FIG. 3) made in such a way that their width "l" and "s" is somewhat greater than the width "k" of the protruding portions of the joining members 14, 15. These parameters are so selected that, when the cylinder 5 is moved to rest against the cylinder 4, it is possible for the spline crests of the joining member 15 of the cylinder 5 to engage in the grooves 14*a*, and 14*b* of the casing 10. The width "l" of the groove 14*a*, which determines the elastic travel of the cylinder 5 before it rests against the cylinder 4. For easy maintenance of the unbalance vibrator, a mark 16 (FIG. 2) is provided at the periphery of the end face of the casing 10, while a dial 16*a* graduated in per cent with respect to the maximum disturbing force, is provided at the periphery of the end face of the cylinder 5.

The drive motor comprises a housing 17 (FIG.) installed on a base 18. The housing 17 accommodates the drive shaft 3 which is journalled in bearings 19, 20 and extends on one side so as to receive the joined cylinders 4, 5 with enclosed unbalance weights 1, 2, and on the other side, so as to connect to a fixed electric motor 21 aligned axially with respect to the shaft. The diameter of the drive shaft 3 decreases, in steps, toward the electric motor 21. The housing 17 is closed at its working end by a cover 22, while its top surface offers a handling clip 23 for carrying the unbalance vibrator.

The unbalance vibrator operates as follows.

In the initial position, the cylinder 5 engages, by its joining member 15, with its mating joining member 14 of the casing 10 so as to form an enclosed space, viz., a rotor with eccentric unbalance mass. Axial movement of the cylinder 5 is prevented by springs 11 and the flange 12. The disturbing force generated with the operation of the electric motor 21 is transmitted, via the unbalance weights 1, 2, to the drive shaft 3 and the housing 17, the amount of the disturbing force being dependent on the mutual position of the unbalance weights 1 and 2. For changing the amount of the disturbing force, the unbalance vibrator must be stopped and the cylinder 5 has to be moved, overcoming the tension of the spring 11, until it rests against the cylinder 4. At this, the protruded portions of the joining member 15 will be in the grooves 14*a*, 14*b*. To set a required amount of the disturbing force, the cylinder 5 should be turned, while checking the amount of turn against the dial 16*a*, and released. The spring 11 will return the cylinder 5 in its initial position where the joining member 15 engages with the joining member 14 of the casing 10 so as to form an operable rotor. Next, the drive motor 21 is started to continue treatment.

Figure 4:
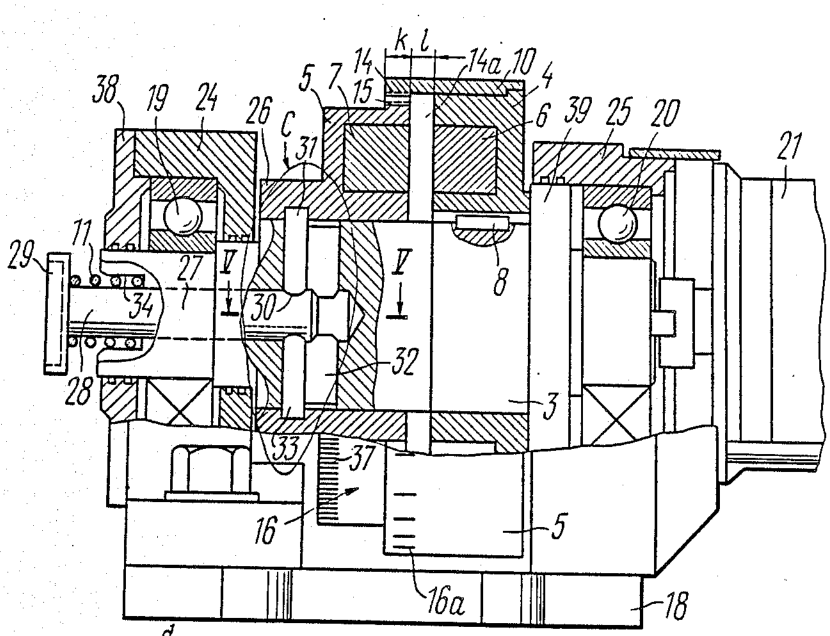
FIG. 4 is a general longitudinal sectional view of an embodiment of an unbalance vibrator, according to the invention.

FIG. 4 shows an embodiment of the unbalance vibrator which differs from that described above in that it provides two supports 24 and 25 for the driver shaft 3 and an appropriately changed mechanism for adjusting the mutual position of the unbalance weights 1, 2. Provision of two supports 24, 25 makes it possible to increase the mass of the unbalance weights, 1, 2, which sharply increases the disturbing force, thus extending the processing capacities of the unbalance vibrator. The cylinder 5 is slidable in an axial direction until the joining member 15 is brought out of engagement with the joining member 14, since the clearance "l" between the unbalance weights 1, 2 is similar in application to the groove 14*a* of the first embodiment described above and is somewhat greater than the width of projection of the joining portion "k", its movement being restricted by the end face of the cylinder 4. The cylinder 5 is provided with the hub 26. The cylinder 5 can be locked in the working position as follows. An axial hole 27 is provided lengthwise the axis of the drive shaft 3, on the opposite side of the drive motor 21. The axial hole receives a rod 28 whose one end terminates in a head 29, while its other end has a radial hole 30 adapted to take a radial retainer 31 extending also within a through radial slot 32 and interacting with an annular groove 33 provided in that surface of the hub 26 of the cylinder 5 which surface mates with the drive shaft 3. The rod 28 is spring-loaded by means of the spring 11 fitted in a groove 34 of the drive shaft 3. The parameters of the components described above are so selected as to enable the protruding portion of the joining member 15 to be brought out of engagement with the joining member 14, and the cylinder 5 to be turnable adjustable. The length of the hold 27 is so selected as to allow for accommodation of the radial slot 32 effecting the interaction between the retainer 31 and the shoulders of the annular groove 33, i.e., the cylinder 5. The width of the slot 32 is so selected as to enable unhindered radial movement of the retainer 31, and its length "d" is chosen to provide for a required length "l" of travel of the cylinder 5. The length of the retainer 31 is so selected as to enable it to be freely fitted in the diametrically opposite portions of the annular groove 33. The width of the groove 33 is so selected as to allow for free accommodation of the retainer 31, and its depth is so chosen as to be sufficient to ensure interaction between the shoulder of the groove 33 and the retainer 31.

Figure 5:
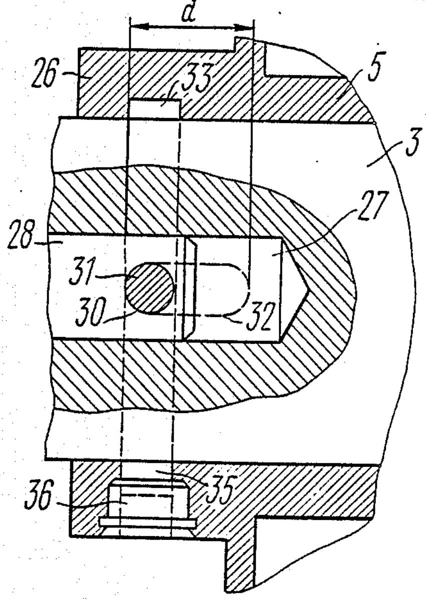
FIG. 5 is a cross-sectional view taken along the line V—V in FIG. 4, according to the invention.

For the assembly of the rod 28 with the retainer 31, i.e., in order to fit the retainer 31 into the hole 30 of the rod 28, the hub 26 has a manufacturing hole 35 (FIG. 5) aligned with the annular groove 33, while its diameter is so selected as to allow for free passage of the retainer 31. After assembly, the manufacturing hole 35 is closed by a plug 36. For ease of rotation of the cylinder 5, a serration 37 (FIG. 4) is provided on its protruding portion.

The bearings 19 of the journal 38 are closed by a cover 38, and the bearings 20 of the journal 25 are closed by a shoulder 39 of the drive shaft 3, which prevents the bearings from ingress of dust or leakage (ejection) of lubricant.

The unbalance vibrator operates in the following manner. In the initial position, the joining member 14 engages with the joining members 15, the cylinder 5 being locked in position by the retainer 31 which is held in the annular groove 33 by means of the rod 28 and the spring 11. Upon starting the drive motor 21, the disturbing force generated by rotation of the unbalance weights 1, 2 is transmitted to the drive shaft 3, the supports 24, 25 and the housing 17.

For changing the amount of the disturbing force, the electric motor 21, hence the unbalance vibrator, has to be stopped. To readjust the amount of the vibrational force, the head 29 as to be depressed and the rod 28 has to be moved, overcoming the tension of the spring 11, so that the retainer 31 engaged in its hole 30 and interacting with the groove in the hub 26, should move the cylinder 5 as to bring the joining member 15 out of engagement with the joining member 14 if the casing 10 until it should rest against the end face of the cylinder 4, whereby the protruding portion of the joining member 15 enters the clearance "l", thus allowing the cylinder 5 to be turned. By turning the head 29 of the rod 28 or the protruding portion of the cylinder 5 in the zone of the serrations 37, the cylinder 5 can be turned, while checking the amount of turn against the dial 16*a*, to readjust the vibrational force for the required amount. After the head 29 has been released, the spring 11 will return the rod 28 to its initial position, thus entraining the retainer 31, and the cylinder 5, whose joining member 15 is brought into engagement with the joining member 14 of the casing 10 whereby an operable rotor is formed.

Figure 6:
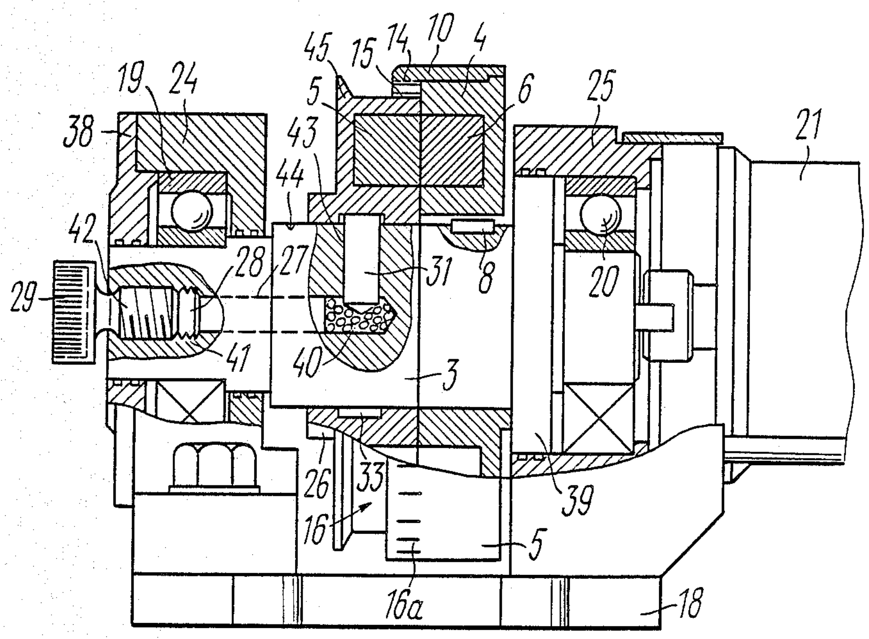
FIG. 6 is a longitudinal sectional view of an embodiment of an unbalance vibrator, according to the invention.

Another embodiment of the unbalance vibrator is illustrated in FIG. 6. If differs from that described above in the construction of the mechanism for adjusting the initial position of the unbalance weights 1, 2. Fitted in the axial hole 27 of the drive shaft 3, under the retainer 31, are balls 40 adapted to interest with the rod 28. For this, the hole 27 is provided with a threaded portion 41, while the rod 28 has a threaded portion 42, a radial hole having a diameter sufficient to allow free movement of the retainer 31 and communicating with the axial role 27, is provided in the drive shaft 3 to receive the retainer 31.

Parameters of the components of the unbalance vibrator are selected on the basis of the same principle, that is provision of a capability for the joining member 14, 15 to disengage from each other. The length of axial movement of the cylinder 5 is selected to be somewhat greater than the width of the joining member 14. The length of the retainer 31 is chosen so as to enable interaction with the shoulders of the annular groove 33, for example, equal to the sum of the radius of the drive shaft 3 and the length of the groove 33. The end face of the retainer 31 adapted to interact with the balls 40, can be made in the form of a taper or hemisphere. The length of the rod 28, the number and diameter of the balls 40 and the diameter of the hole 27 are so selected as to allow interaction between the balls 40 and the retainer 31. The diameter of the balls 40 is selected so as to suit the condition of their positive moveability, i.e. 4 to 5 times less than that of the hole 27, the diameter of the retainer 31 being approximately equal to that of the hole 27. For easy maintenance and identification of the vertical position of the retainer 31, a mark 44 is provided on the shaft 3. The outer end face of the cylindrical portion of the cylinder 5 has a flanged projecting member 45, which facilitates handling of the movable cylinder 5.

The embodiment now under consideration differs in the operations involved in readjusting the disturbing force.

For changing the amount of the disturbing force, the electric motor 21 is to be stopped. To readjust vibrational force, the drive shaft 3 has to be placed so that the mark 44 is directed upward, which is indicative that the retainer 31 is in its uppermost, vertical position. Turning the head 29 releases the rod 28 which moves to increase the volume of the space of the hole 27 accommodating the balls 40. The balls are caused to spread over the hole 27 and the retainer 31 is brought down from the annular groove 33 to release the cylinder 5. The cylinder 5 is then moved lengthwise the axis of the drive shaft 3, through the agency of the projecting member 45, until the joining member 15 is brought out of engagement with the joining member 14 of the casing 10, so that the cylinder 5 can be turned. The amount of turn is choked as against the dial 16*a* and the mark 16, until a required reading is obtained. The joining member 15 is again brought into engagement with the joining member 14 by reversing the axial movement. To retain the present position, the head 29 is rotated to turn in the rod 28 which first presses the balls 40 together so as to urge the retainer 31 to move into the annular groove 33, and holding it therein, which prevents axial displacement of the cylinder 5.

Upon starting the electric motor 21, the unbalance weights 1, 2 transmit the disturbing force to the drive shaft 3, the support 24 and the housing 17.

We claim:

1. An unbalance vibrator comprising:
a drive shaft;
unbalance weights in a clearance fit on said drive shaft and turnable with respect to each other,
a mechanism for adjusting the mutual position of said unbalance weights,
said mechanism made in the form of two coaxially arranged carrying members, of which one member is rigidly secured to said drive shaft, while the other member is mounted so as to be turnable and axially movable with respect to said drive shaft,
said carrying members being two cylinders inserted one into the other, said cylinders being provided with joining members to be engaged therewith,
portions of said cylinders having said joining members including grooves having a width greater than a distance between adjacent grooves.

2. An unbalance vibrator comprising:
a drive shaft,
unbalance weights in a clearance fit on said drive shaft and turnable with respect to each other,
a mechanism for adjusting the mutual position of said unbalance weights,
said mechanism being two coaxially arranged cylinders carrying said unbalance weights, one of said cylinders being rigidly mounted on said drive shaft, the other of said cylinders being mounted so as to be turnable and axially traversable with respect to said drive shaft,
said movable cylinder being spring-loaded in an axial direction, whereas portions of said cylinders having joining members include grooves having a width greater than a distance between adjacent grooves.

3. An unbalance vibrator comprising:
a drive shaft;
unbalance weights in a clearance fit on said drive shaft and turnable with respect to each other,
a mechanism for adjustment the mutual position of said unbalance weights,
said mechanism being two coaxially arranged cylinders carrying said unbalance weights, one of said cylinders being rigidly mounted on said drive shaft, the other of said cylinders being mounted so as to be turnable and axially traversable with respect to said drive shaft,
said movable cylinder having an annular groove provided at a point where said movable cylinder engages with said drive shaft, while said drive shaft has a radial hole terminating in a radial slot whose length is greater than the clearance between said unbalance weights, said radial hole of said drive shaft being adapted to receive a spring-loaded rod provided with a radial hole disposed close to said annular groove, and a retainer being fitted in said radial slot and said radial hole of said drive shaft and said rod, respectively.

4. An unbalance vibrator comprising:
a drive shaft,
unbalance weights in a clearance fit on said drive shaft and turnable with respect to each other,
a mechanism for adjusting the mutual position of said unbalance weights,
said mechanism being two coaxially arranged cylinders carrying said unbalance weights, one of said cylinders being rigidly mounted on said drive shaft, the other of said cylinders being mounted so as to turnable and axially traversable with respect to said drive shaft,
said movable cylinder having an angular groove provided at a point where said movable cylinder engages with said drive shaft, while said drive shaft is provided with an axial hole having at its end a radial hole engageable with said annular groove adapted to receive a retainer, said axial hole of said drive shaft accommodating an adjusting rod adapted to interact with balls arranged under said retainer.

* * * * *